US010451024B2

(12) United States Patent
Inoue et al.

(10) Patent No.: US 10,451,024 B2
(45) Date of Patent: Oct. 22, 2019

(54) INTERNAL COMBUSTION ENGINE ABNORMAL COMBUSTION DETECTION DEVICE

(71) Applicant: Mitsubishi Electric Corporation, Tokyo (JP)

(72) Inventors: Junichi Inoue, Tokyo (JP); Yuhei Matsushima, Tokyo (JP); Toshikatsu Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 15/652,354

(22) Filed: Jul. 18, 2017

(65) Prior Publication Data

US 2018/0298871 A1    Oct. 18, 2018

(30) Foreign Application Priority Data

Apr. 14, 2017    (JP) .................... 2017-080272

(51) Int. Cl.
| | | |
|---|---|---|
| *F02P 5/152* | (2006.01) | |
| *F02D 35/02* | (2006.01) | |
| *F02P 17/02* | (2006.01) | |
| *G01L 23/22* | (2006.01) | |

(52) U.S. Cl.
CPC ............ *F02P 5/152* (2013.01); *F02D 35/027* (2013.01); *F02P 17/02* (2013.01); *G01L 23/225* (2013.01)

(58) Field of Classification Search
CPC ......... F02P 5/152; F02P 17/02; G01L 23/225; F02D 35/027
See application file for complete search history.

(56) References Cited

U.S. PATENT DOCUMENTS

| | | | |
|---|---|---|---|
| 5,632,247 A | 5/1997 | Hashizume et al. | |
| 6,105,552 A * | 8/2000 | Arisawa | F02D 35/027 123/406.37 |
| 8,316,824 B2 * | 11/2012 | Hagari | F02D 13/0226 123/406.29 |
| 8,392,094 B2 * | 3/2013 | Makino | F02D 35/021 701/102 |
| 8,639,432 B2 * | 1/2014 | Matsuo | F02D 35/02 123/406.11 |
| 9,074,538 B2 * | 7/2015 | Itou | G01L 23/225 |
| 9,541,014 B2 * | 1/2017 | Glugla | F02D 31/006 |
| 9,759,145 B2 * | 9/2017 | Glugla | F02D 41/0087 |

(Continued)

FOREIGN PATENT DOCUMENTS

| | | |
|---|---|---|
| JP | 61-187558 A | 8/1986 |
| JP | 08-319931 A | 12/1996 |

(Continued)

*Primary Examiner* — David Hamaoui
(74) *Attorney, Agent, or Firm* — Sughrue Mion, PLLC; Richard C. Turner

(57) ABSTRACT

Knocking and pre-ignition are identified, without contributing to pre-ignition, even when vibration magnitudes and timings of occurrence of the knocking and pre-ignition are the same. When detecting an abnormal combustion that cannot be identified as a knocking or pre-ignition, ignition timing is advanced, at which time knocking is identified when an abnormal combustion intensity increases, and pre-ignition is identified when a difference between ignition timing and abnormal combustion occurrence timing increases.

5 Claims, 7 Drawing Sheets

(56) References Cited

U.S. PATENT DOCUMENTS

2002/0179054 A1 12/2002 Miyaji
2013/0179052 A1 7/2013 Kawakami et al.

FOREIGN PATENT DOCUMENTS

| JP | 2002-357156 A | 12/2002 |
| JP | 2013-142333 A | 7/2013 |
| JP | 2013-160200 A | 8/2013 |
| JP | 2015-014229 A | 1/2015 |

* cited by examiner

INTERNAL COMBUSTION ENGINE ABNORMAL COMBUSTION DETECTION DEVICE

BACKGROUND OF THE INVENTION

Field of the Invention

The present invention relates to an internal combustion engine abnormal combustion detection device that detects abnormal combustion caused by knocking or pre-ignition occurring in an internal combustion engine.

Description of the Related Art

A method whereby knocking, which is one kind of abnormal combustion occurring in an internal combustion engine (hereafter also referred to as an engine), is detected by a knocking sensor is already known. It is known that when knocking occurs while an engine is operating, vibration in a unique frequency band occurs in accordance with the engine or knocking vibration mode, and knocking detection is carried out by measuring the vibration intensity of this unique frequency.

Abnormal combustion caused by knocking is as follows.

Firstly, after a spark is ignited by an ignition plug, a flame spreads centered on the ignition plug. At this time, an unburned air-fuel mixture (end gas) in a place far from the ignition plug is pressed against a piston or cylinder wall face, and reaches a high temperature and high pressure. As a result of this, a shock wave is generated when the end gas self-ignites. Because of this, it is conceivable that cylinder pressure or engine block vibration and metallic noise will occur.

Pre-ignition is also known as another kind of abnormal combustion occurring in an engine. For example, the following two cases are conceivable as abnormal ignition called pre-ignition.

Firstly, a case in which a deposit in an ignition plug or cylinder reaches a high temperature, leading to ignition with the deposit as a heat source, is conceivable. Secondly, a case in which an air-fuel mixture reaches a high temperature and high pressure in a compression stroke when a compression ratio is high, leading to self-ignition, is conceivable. In these kinds of case too, there may be accompanying cylinder pressure or engine block vibration and metallic noise.

A direct-injection turbo engine, which has increased output in a low-speed region and whose introduction has been advancing in recent years, is such that pre-ignition occurring in a low-speed region is a problem, and is called low-speed pre-ignition (LSPI).

When pre-ignition occurs too, there may be accompanying engine vibration, because of which a method of detecting pre-ignition by applying the previously described knocking detection method has been proposed. A method whereby pre-ignition is detected based on the magnitude of an abnormal combustion amplitude and a timing of occurrence is known as this method, as disclosed in, for example, Patent Document 1 and Patent Document 2.

Generally, a method whereby an ignition timing is retarded is known as a method of restricting knocking, as disclosed in, for example, Patent Document 3. Also, a method whereby an amount of air taken in is reduced, a method whereby an amount of fuel injected is increased, and a method whereby an increase in the amount of fuel injected and an advancement of the ignition timing are combined, are known as methods of restricting pre-ignition, as disclosed in, for example, Patent Document 4, Patent Document 5, and Patent Document 6.

Patent Document 1: JP-A-2013-160200
Patent Document 2: JP-A-2013-142333
Patent Document 3: JP-A-2002-357156
Patent Document 4: JP-A-08-319931
Patent Document 5: JP-A-61-187558
Patent Document 6: JP-A-2015-014229

However, there are the following kinds of problem with the heretofore described existing technology. That is, the existing method whereby pre-ignition is detected based on the magnitude of an abnormal combustion vibration and a timing of occurrence is such that a pre-ignition of a vibration greater than that of a knocking that is likely to occur under control is detected, but as amplitude when a pre-ignition occurs is of varying magnitude, pre-ignition when the vibration magnitude and timing of occurrence are the same as those of a knocking cannot be detected, and the pre-ignition is mistakenly determined to be a knocking. When a pre-ignition is mistakenly determined to be a knocking and the ignition timing is retarded, the temperature of exhaust gas rises in accompaniment with a decrease in combustion efficiency, leading to a rise in cylinder temperature. When cylinder temperature rises, there is a problem in that a state wherein a pre-ignition is likely to occur in the next compression stroke arises, contributing to pre-ignition. Furthermore, as the ignition timing continues to be retarded while the pre-ignition is mistakenly determined to be a knocking, there is a problem in that torque continues to decrease considerably.

Also, the heretofore described existing methods of restricting pre-ignition are methods that are also effective in restricting knocking, but as there is an accompanying output decrease and a worsening of fuel efficiency due to ignition timing being retarded, there is a problem in that the methods cannot be actively implemented for restricting knocking that occurs frequently in a normal driving state, and have to be implemented after establishing pre-ignition.

SUMMARY OF THE INVENTION

The invention, having been contrived in order to resolve the heretofore described kinds of problem, has an object of providing an internal combustion engine abnormal combustion detection device such that knocking and pre-ignition can be identified, without contributing to pre-ignition, even when vibration magnitudes and timings of occurrence of the knocking and pre-ignition are the same.

An internal combustion engine abnormal combustion detection device according to the invention includes a driving state detection device that detects a driving state of an internal combustion engine, and a control device that controls the internal combustion engine based on an output signal from the driving state detection device, wherein the control device includes an ignition timing controller that controls an ignition timing in accordance with the driving state, a crank angle detector that detects a crank angle of the internal combustion engine, an abnormal combustion vibration calculator that obtains a magnitude of an abnormal combustion vibration based on an output signal from a combustion state detection device provided in the internal combustion engine, an abnormal combustion vibration occurrence timing calculator that obtains an abnormal combustion vibration occurrence timing based on an output signal from the combustion state detection device provided in the internal combustion engine, an abnormal combustion relative occurrence period calculator that calculates relative periods of the ignition timing and an abnormal combustion occurrence period, an abnormal combustion detector that detects that an abnormal combustion has occurred when the magnitude of the abnormal combustion vibration exceeds a preset abnormal combustion determination threshold, a knocking intensity calculator that calculates an amount by which the abnormal combustion determination threshold is exceeded as knocking intensity, an abnormal combustion category controller that identifies one of a knocking, pre-ignition, or non-specific abnormal combustion based on the abnormal combustion vibration occurrence timing, and a non-specific abnormal combustion controller that, when a non-specific abnormal combustion is identified by the abnormal combustion category controller, advances an ignition timing set in accordance with the driving state, and when the ignition timing is advanced, identifies a knocking when knocking intensity increases, and identifies a pre-ignition when an abnormal combustion relative occurrence period increases.

According to the internal combustion engine abnormal combustion detection device according to the invention, the heretofore described configuration is such that when detecting an abnormal combustion that cannot be identified as a knocking or pre-ignition, advancement is carried out without carrying out a retarding of ignition timing that contributes to pre-ignition. At this time, the abnormal combustion can be determined to be a knocking when the magnitude of abnormal combustion vibration increases, and the abnormal combustion can be determined to be a pre-ignition when ignition timing and abnormal combustion occurrence timing periods increase. Therefore, knocking and pre-ignition can be identified without contributing to pre-ignition.

The foregoing and other objects, features, aspects and advantages of the invention will become more apparent from the following detailed description of the invention when taken in conjunction with the accompanying drawings.

DETAILED DESCRIPTION OF THE PREFERRED EMBODIMENTS

Figure 1:
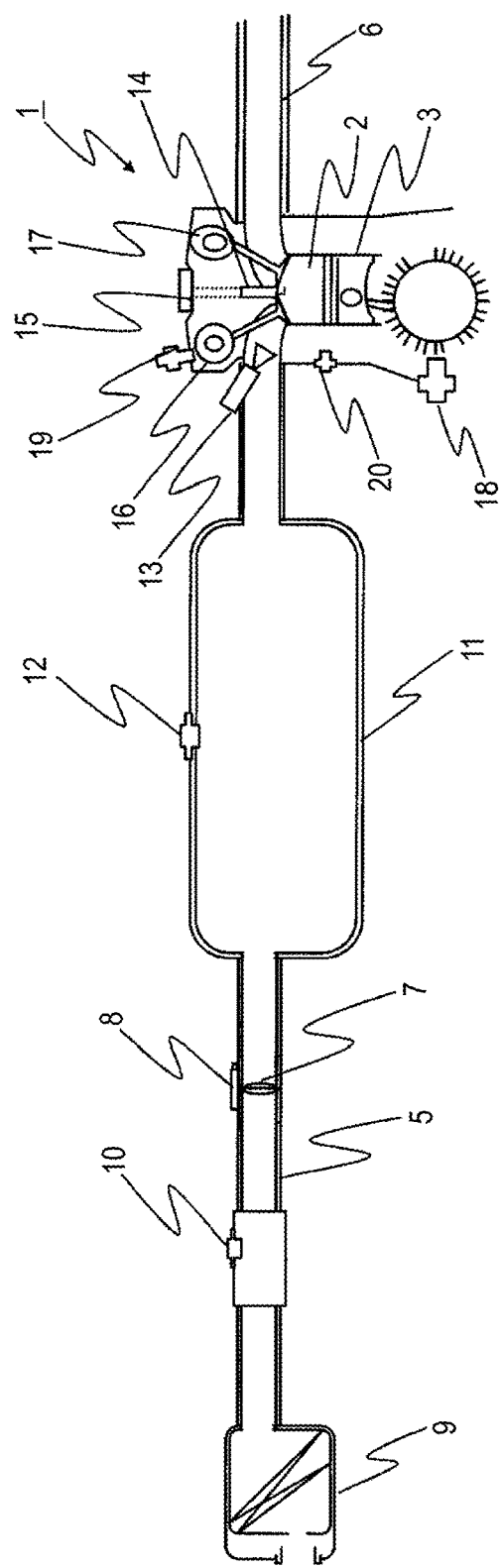
FIG. 1 is a schematic configuration diagram of an internal combustion engine according to a first embodiment of the invention.

Hereafter, referring to the drawings, a description will be given of a preferred embodiment of an internal combustion engine abnormal combustion detection device according to the invention. The description will be given with identical reference signs allotted to identical or corresponding portions in the drawings.

First Embodiment

FIG. 1 is a schematic configuration diagram of an internal combustion engine 1 according to a first embodiment. The internal combustion engine 1 includes a multiple of a cylinder 2 and piston 3, but for the sake of convenience, only one cylinder 2 and one piston 3 are shown in FIG. 1. The internal combustion engine 1 and a control device 4 to be described hereafter are mounted in a vehicle, and the internal combustion engine 1 forms a drive power source of the vehicle (wheels).

1. Configuration of Internal Combustion Engine 1

Firstly, a configuration of the internal combustion engine 1 will be described. The internal combustion engine 1 has a cylinder 2 in which a mixture of air and fuel is burned. The internal combustion engine 1 includes an intake passage 5 that supplies air to the cylinder 2, and an exhaust passage 6 that discharges exhaust gas burned in the cylinder 2. The internal combustion engine 1 includes a throttle valve 7 that opens and closes the intake passage 5. The throttle valve 7 is configured of an electronically controlled throttle valve driven so as to open and close by an electric motor (not shown) controlled by the control device 4. A throttle aperture sensor 8 that outputs an electrical signal in accordance with an aperture of the throttle valve 7 is provided in the throttle valve 7.

An air cleaner 9 that purifies air suctioned into the intake passage 5 is provided in a most upstream portion of the intake passage 5. An air flow sensor 10 that outputs an electrical signal in accordance with a flow of air suctioned into the intake passage 5 is provided in the intake passage 5 on an upstream side of the throttle valve 7. A portion of the intake passage 5 on a downstream side of the throttle valve 7 is taken to be an intake manifold 11, and is linked to a multiple of the cylinder 2. A portion on an upstream side of the intake manifold 11 is taken to be a surge tank that restricts an intake pulsation.

A manifold pressure sensor 12 that outputs an electrical signal in accordance with a manifold pressure, which is the pressure of a gas inside the intake manifold 11, is provided in the intake manifold 11. Either the air flow sensor 10 or manifold pressure sensor 12 may also be provided alone. An injector 13 that injects fuel is provided in a portion on a downstream side of the intake manifold 11. The injector 13 may also be provided so as to inject fuel directly into the cylinder 2.

An ignition plug 14 that ignites a mixture of air and fuel, and an ignition coil 15 that supplies ignition energy to the ignition plug 14, are provided in an apex portion of the cylinder 2. Also, an intake valve 16 that regulates a flow of air taken into the cylinder 2 from the intake passage 5, and an exhaust valve 17 that regulates a flow of exhaust gas discharged from inside the cylinder 2 into the exhaust passage 6, are provided in the apex portion of the cylinder 2. A variable intake valve timing mechanism that enables timing of opening and closing the intake valve 16 to be varied is provided in the intake valve 16. The variable intake valve timing mechanism has an electric actuator (not shown) that changes the timing of opening and closing the intake valve 16.

A signal plate on whose outer perimeter a multiple of teeth are provided at intervals of a preset angle is provided on a crankshaft of the internal combustion engine 1. A crank angle sensor 18 is fixed to a cylinder block opposing the teeth of the signal plate on the crankshaft, and outputs a pulse signal synchronized with a passing of the teeth. Although omitted from the drawing, a signal plate on whose outer perimeter a multiple of teeth are provided at intervals of a preset angle is provided on a camshaft of the internal combustion engine 1. A cam angle sensor 19 is fixed opposing the teeth of the signal plate on the camshaft, and outputs a pulse signal synchronized with a passing of the teeth.

The control device 4, based on the two kinds of output signal from the crank angle sensor 18 and cam angle sensor 19, uses a crank angle detection unit (not shown) to detect a crank angle with a top dead center of each piston 3 as a reference, and distinguishes a stroke of each cylinder 2.

A knocking sensor 20 that functions as a combustion state detection device is fixed to the cylinder block. The knocking sensor 20 is configured of a piezoelectric element or the like, and outputs a signal (vibration waveform signal) in accordance with vibration of the internal combustion engine 1.

2. Configuration of Control Device 4

Next, the control device 4 will be described. The control device 4 is a control device that has the internal combustion engine 1 as a control target. As shown in a block diagram in FIG. 2, the control device 4 includes control units including a knocking signal calculation unit 4a, a knocking determination threshold calculation unit 4b, which is an abnormal combustion detection unit, a knocking intensity calculation unit 4c, an abnormal combustion category determination unit 4d, a non-specific abnormal combustion control unit 4e, a pre-ignition control unit 4f, and a knocking control unit 4g. Each control unit 4a to 4g and the like of the control device 4 is realized by a processing circuit included in the control device 4. Specifically, the control device 4 is configured to include as the processing circuit a processing unit (computer) 30 such as a central processing unit (CPU), a storage device 31 that exchanges data with the processing unit 30, an input circuit 32 that inputs an external signal into the processing unit 30, and an output circuit 33 that outputs a signal from the processing unit 30 to the exterior, as shown in FIG. 3.

A random access memory (RAM) 31a configured so as to read data from the processing unit 30 and into which data can be written, a read only memory (ROM) 31b configured so as to be able to read data from the processing unit 30, and the like, are included in the storage device 31. An A/D converter (not shown) or the like, to which are connected various kinds of sensor and switch and which inputs output signals from the sensors and switches into the processing unit 30, is included in the input circuit 32. A drive circuit (not shown) or the like, to which are connected electrical loads and which outputs control signals from the processing unit 30 to the electrical loads, is included in the output circuit 33.

Further, functions of the control units 4a to 4g and the like included in the control device 4 are realized by the processing unit 30 executing software (a program) stored in the storage device 31, such as the ROM 31b, and cooperating with other hardware of the control device 4, such as the storage device 31, input circuit 32, and output circuit 33. Setting data such as threshold values used by the control units 4a to 4g and the like are stored in the storage device 31, such as the ROM 31b, as one portion of the software (program).

In this embodiment, driving state detection devices that detect a driving state of the internal combustion engine 1, such as the air flow sensor 10, throttle aperture sensor 8, manifold pressure sensor 12, crank angle sensor 18, cam angle sensor 19, knocking sensor 20, and an accelerator position sensor 34, are connected to the input circuit 32. The throttle valve 7 (electric motor), injector 13, intake valve 16 configured of a variable intake valve timing mechanism, ignition coil 15, and the like, are connected to the output circuit 33. Various kinds of sensor, switch, actuator, and the like, not shown in the drawings are also connected to the control device 4.

The control device 4 detects an amount of intake air based on an output signal from the air flow sensor 10 or manifold pressure sensor 12, or the like, detects a throttle aperture based on an output signal from the throttle aperture sensor 8, and detects an accelerator aperture based on an output signal from the accelerator position sensor 34. The control device 4 detects a crankshaft angle and rotation speed, and timing of opening and closing the intake valve 16, based on output signals from the crank angle sensor 18 and cam angle sensor 19.

As a basic control, the control device 4 calculates an amount of fuel to be injected, ignition timing, and the like, based on input output signals from various kinds of sensor, and the like, and carries out drive control of the injector 13, ignition coil 15, and the like. The control device 4 calculates output torque of the internal combustion engine 1 required by a driver based on accelerator aperture and the like, and controls the throttle valve 7 and the like so that an amount of intake air that realizes the required output torque is obtained.

Specifically, the control device 4 calculates a target throttle aperture, and carries out drive control of the electric motor of the throttle valve 7 so that the throttle aperture nears the target throttle aperture. Also, the control device 4 calculates a target timing of opening and closing the intake valve 16 based on the crankshaft rotation speed, amount of intake air, and the like, of the internal combustion engine 1, and carries out drive control of the electric actuator of the variable intake valve timing mechanism so that the timing of opening and closing the intake valve 16 nears the target opening and closing timing. In this way, the control device 4 includes an ignition timing control unit (not shown) that controls ignition timing.

Configuration of Knocking Signal Calculation Unit 4a

Next, the knocking signal calculation unit 4a will be described. The knocking signal calculation unit 4a, based on an output signal from a combustion state detection device that outputs a signal in accordance with a combustion state of the internal combustion engine 1, calculates a knocking signal KNK that represents a characteristic component of a knocking. In this embodiment, the combustion state detection device is taken to be the knocking sensor 20.

Figure 2:
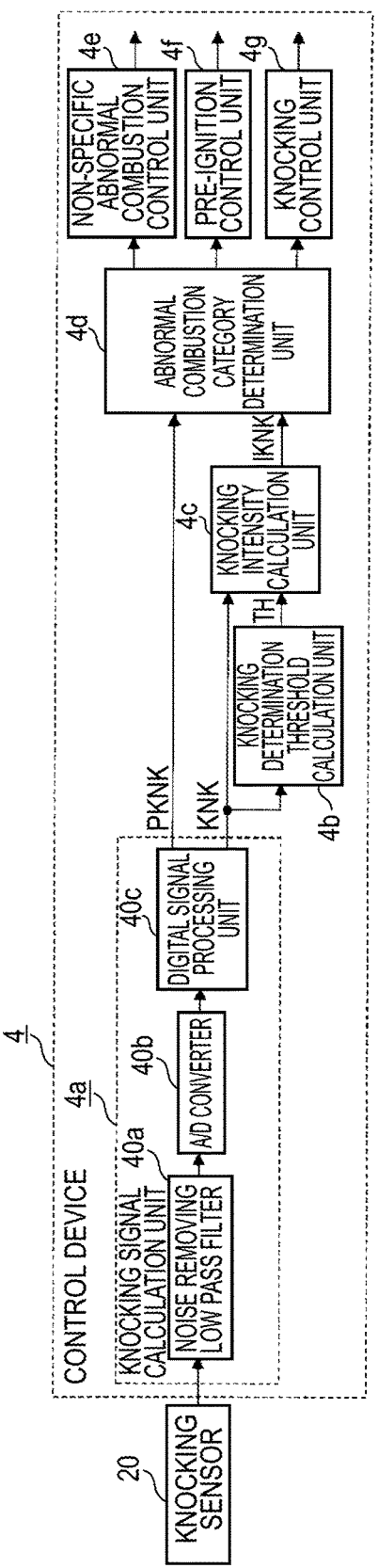
FIG. 2 is a block diagram of an internal combustion engine control device according to the first embodiment of the invention.
Figure 3:
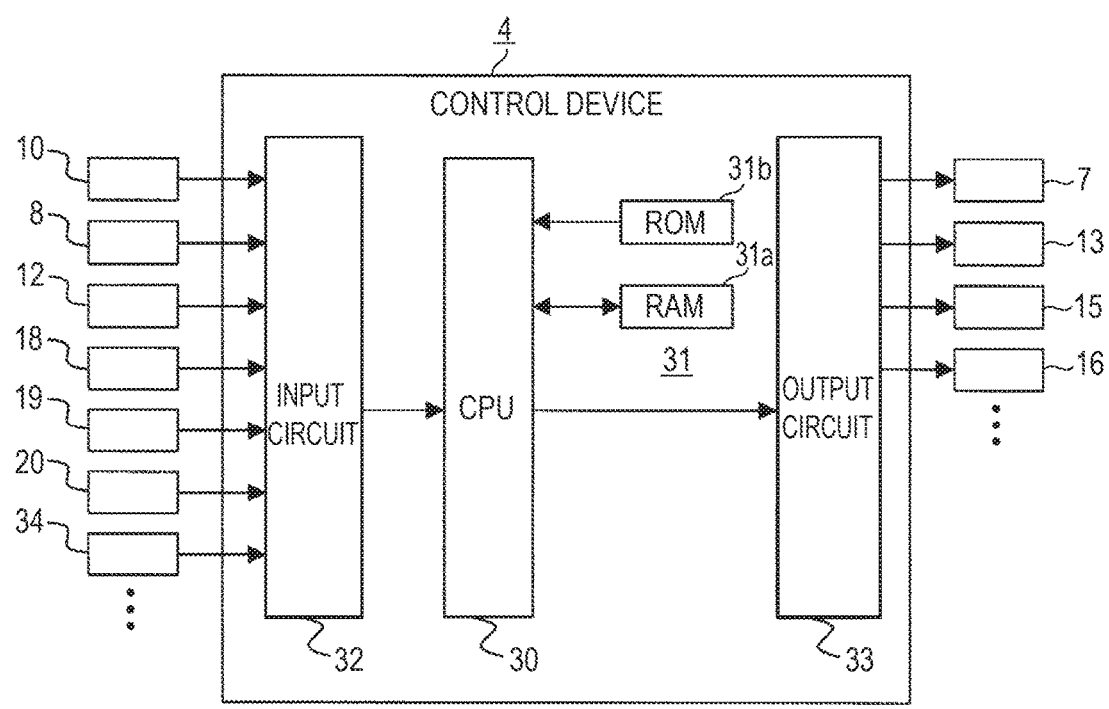
FIG. 3 is a hardware configuration diagram of the internal combustion engine control device according to the first embodiment of the invention.

As shown in FIG. 2, the knocking signal calculation unit 4a includes a noise removing low pass filter 40a that removes a high frequency noise component from an output signal from the knocking sensor 20, an A/D converter 40b that inputs an output value of the noise removing low pass filter 40a into the processing unit 30, and a digital signal processing unit 40c that carries out a digital signal processing with respect to an A/D conversion value in the processing unit 30. The noise removing low pass filter 40a and A/D converter 40b configure the input circuit 32.

The noise removing low pass filter 40a, as previously described, receives a vibration waveform signal of the internal combustion engine 1 output from the knocking sensor 20, and removes a high frequency noise component from the vibration waveform signal. The noise removing low pass filter 40a is configured so as to apply a bias voltage of 2.5V to the signal before or after filtering, a filter output signal oscillates in a range of 0V to 5V centered on 2.5V, and the total amplitude is converted by the A/D converter 40b. Also, the noise removing low pass filter 40a also has a gain conversion function of amplifying the signal centered on 2.5V when the signal amplitude is small, and reducing the signal centered on 2.5V when the signal amplitude is large.

The A/D converter 40b converts an analog signal output from the noise removing low pass filter 40a into a digital signal. This A/D conversion is executed at a constant time interval, for example, every 10 μs or 20 μs.

The A/D converter 40b constantly carries out the A/D conversion, and transmits only data of a knocking detection period corresponding to a knocking occurrence period (for example, from the top dead center (TDC) of the piston to a 50° CA after the top dead center (ATDC)) from among data after the A/D conversion to the digital signal processing unit 40c. Alternatively, the A/D converter 40b may carry out the A/D conversion for only the knocking detection period, and transmit the data after the A/D conversion to the digital signal processing unit 40c.

The digital signal processing unit 40c carries out a time and frequency analysis on a digital signal input from the A/D converter 40b. For example, the digital signal processing unit 40c calculates a spectral sequence of a unique knocking frequency component every predetermined time interval using a process such as a discrete Fourier transform (DFT) or short-time Fourier transform (STFT). Alternatively, the digital signal processing unit 40c may extract the unique knocking frequency component using an infinite impulse response (IIR) filter or finite impulse response (FIR) filter, or the like. The digital signal processing unit 40c calculates a peak value of the spectral sequence as the knocking signal KNK. The digital signal processing unit 40c may also calculate an average value of the spectral sequence as the knocking signal KNK. Also, the digital signal processing unit 40c calculates a crank angle of the calculated knocking signal KNK as an abnormal combustion occurrence timing PKNK. An abnormal combustion occurrence timing is such that a vibration rise position or the like may be used as a value representing a vibration position. In this way, the digital signal processing unit 40c functions as an abnormal combustion vibration calculation unit that obtains the magnitude of an abnormal combustion vibration based on an output signal from the knocking sensor 20, an abnormal combustion vibration occurrence timing calculation unit that obtains an abnormal combustion vibration occurrence timing, and an abnormal combustion relative occurrence period calculation unit that calculates relative periods of an ignition timing and abnormal combustion occurrence timing.

Processes of the knocking determination threshold calculation unit 4b, knocking intensity calculation unit 4c, and abnormal combustion category determination unit 4d using the knocking signal KNK and abnormal combustion occurrence timing PKNK are implemented by an interrupt processing synchronized with a preset crank angle (for example, an interrupt processing at a 75° CA before top dead center (BTDC)). Because of this, the digital signal processing unit 40c ends processing by the start of the interrupt processing of the knocking determination threshold calculation unit 4b and the like.

Configuration of Knocking Determination Threshold Calculation Unit 4b

Next, the knocking determination threshold calculation unit 4b will be described. The knocking determination threshold calculation unit 4b carries out a smoothing process on the knocking signal KNK calculated in the knocking signal calculation unit 4a, thereby calculating an averaged background level BGL, as shown in the following Expression 1. In the following expression, (n) indicates a value calculated by the current interrupt processing, and (n−1) indicates a value calculated by the previous interrupt processing.

$$BGL(n)=K \times BGL(n-1)+(1-K) \times KNK(n) \quad (1)$$

Continuing, the knocking determination threshold calculation unit 4b calculates a knocking determination threshold TH based on the background level BGL. In this embodiment, the knocking determination threshold calculation unit 4b calculates a value that is the background level BGL multiplied by a threshold calculation coefficient Kth as the knocking determination threshold TH, as shown in the following Expression 2.

$$TH(n)=Kth \times BGL(n) \quad (2)$$

As the threshold calculation coefficient Kth is a value adapted so that a result of evaluating knocking intensity is appropriate, a value in the region of, for example, "3" is set.

Configuration of Knocking Intensity Calculation Unit 4c

Next, the knocking intensity calculation unit 4c will be described. The knocking intensity calculation unit 4c determines a knocking intensity IKNK based on the knocking signal KNK and knocking determination threshold TH. In this embodiment, the knocking intensity calculation unit 4c calculates a value that is a value of the knocking determination threshold TH subtracted from the knocking signal KNK divided by the background level BGL as the knocking intensity IKNK, as shown in the following Expression 3. In this way, the value of the subtraction is divided by the background level BGL, and normalized.

$$IKNK(n)=(KNK-TH(n))/BGL(n) \quad (3)$$

The knocking signal KNK exceeding the knocking determination threshold TH and the knocking intensity IKNK becoming a positive value indicates that a knocking has occurred, and the knocking intensity IKNK increases in proportion to the amount by which the knocking signal KNK exceeds the knocking determination threshold TH.

Configuration of Abnormal Combustion Category Determination Unit 4d

Next, the abnormal combustion category determination unit 4d will be described. The abnormal combustion category determination unit 4d determines whether there is a knocking, pre-ignition, or non-specified abnormal combustion based on the abnormal combustion occurrence timing PKNK. In this embodiment, knocking is an abnormal combustion occurring due to an ignition spark, because of which a crank period in which knocking is detected is set to be after the ignition timing. Also, pre-ignition is an abnormal combustion caused by self-ignition before an ignition spark, but as there may also be a case in which knocking sensor vibration timing when there is abnormal combustion occurs further to the retarded side than the ignition timing, a crank period in which pre-ignition is detected is set to be further to the retarded side than the ignition timing. As the knocking and pre-ignition detection periods overlap, a knocking detection period in which the knocking and pre-ignition detection periods do not overlap is taken to be an independent knocking detection period, a pre-ignition detection period in which the knocking and pre-ignition detection periods do not overlap is taken to be an independent pre-ignition detection period, and a period in which knocking and pre-ignition detection periods overlap is taken to be an overlapping knocking and pre-ignition detection period.

When the abnormal combustion occurrence timing PKNK is within the independent knocking detection period, the abnormal combustion category determination unit 4d determines that the abnormal combustion is a knocking, and when the abnormal combustion occurrence timing PKNK is within the independent pre-ignition detection period, the abnormal combustion category determination unit 4d determines that the abnormal combustion is a pre-ignition. When the abnormal combustion occurrence timing PKNK is in the overlapping knocking and pre-ignition detection period, the abnormal combustion category determination unit 4d cannot specify whether the abnormal combustion is a knocking or a pre-ignition, so determines that the abnormal combustion is a non-specific abnormal combustion. As a pre-ignition is likely to occur at a low rotation and high load, a period in which pre-ignition is only detected within a preset low rotation/high load region may be provided.

Configuration of Non-specific Abnormal Combustion Control Unit 4e

Next, the non-specific abnormal combustion control unit 4e will be described. When an abnormal combustion is a non-specific abnormal combustion, the non-specific abnormal combustion control unit 4e determines whether or not the ignition timing can be advanced, and advances the ignition timing when determining that the ignition timing can be advanced. In this embodiment, the non-specific abnormal combustion control unit 4e determines whether or not the knocking intensity IKNK is equal to or lower than a preset threshold, and advances the ignition timing when the knocking intensity IKNK is equal to or lower than the threshold. The threshold may be set at, for example, a maximum value of a knocking control range, the non-specific abnormal combustion control unit 4e may determine that an abnormal combustion is a pre-ignition when the knocking intensity IKNK is equal to or higher than the threshold, and pre-ignition control may be implemented using a method according to the pre-ignition control unit 4f, to be described hereafter. Advancement of the ignition timing may be as far as, for example, MBT, or may be as far as a preset advancement amount.

Herein, using FIGS. 4A and 4B and FIGS. 5A and 5B, a description will be given of a change in the behavior of knocking and pre-ignition knocking sensor signals when the ignition timing is advanced.

Figure 4A:
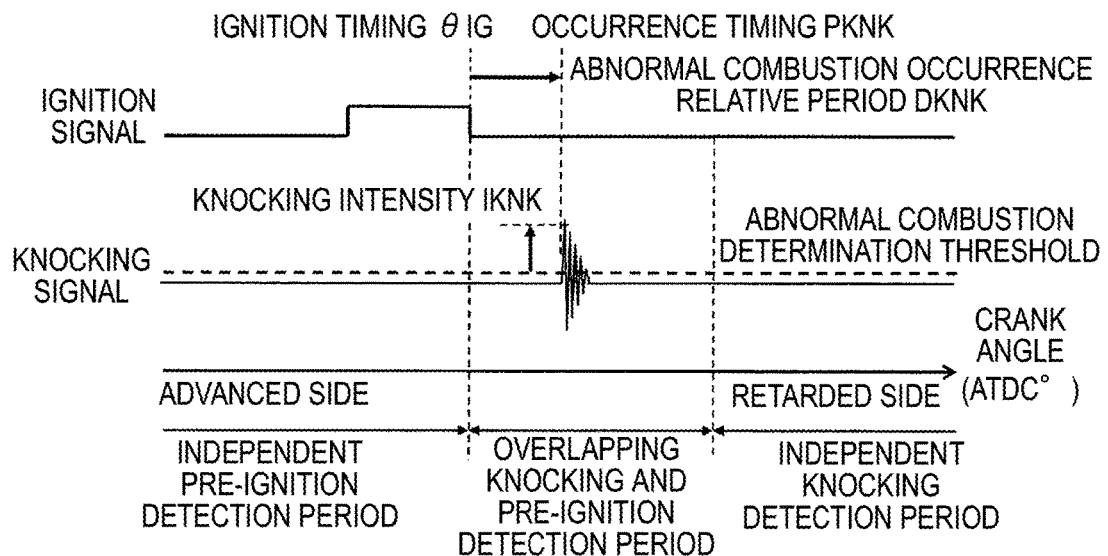
FIG. 4A is a timing chart for describing a change in a knocking sensor signal before an ignition timing advancement when a knocking occurs according to the first embodiment of the invention.
Figure 4B:
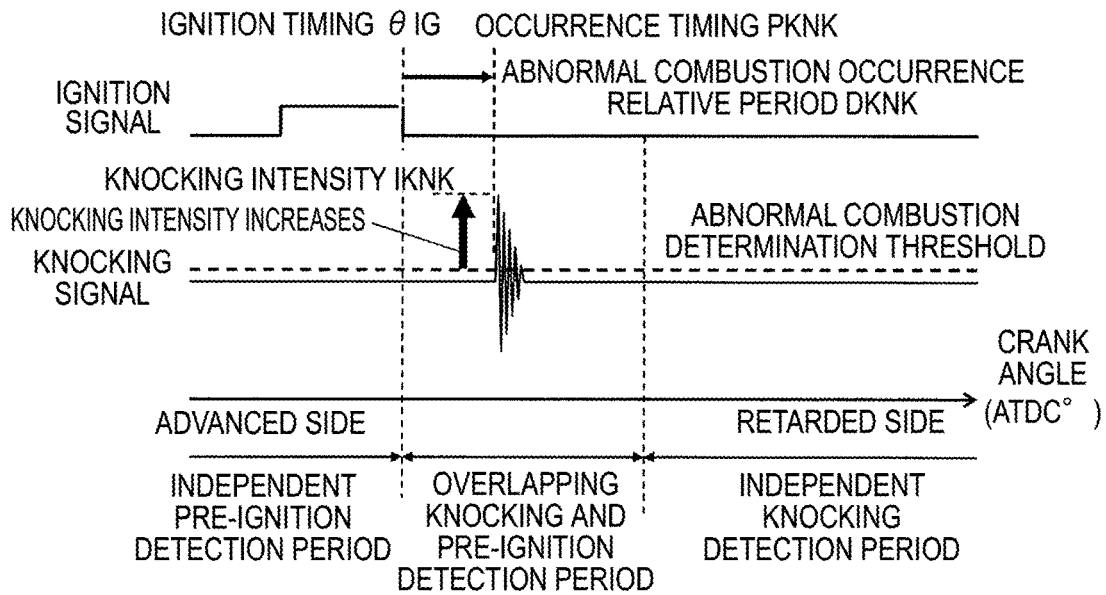
FIG. 4B is a timing chart for describing a change in a knocking sensor signal after an ignition timing advancement when a knocking occurs according to the first embodiment of the invention.

FIGS. 4A and 4B show a change in a knocking signal when the ignition timing is advanced in a case in which an abnormal combustion is a knocking. FIG. 4A shows a state before the ignition timing is advanced, FIG. 4B shows a state after the ignition timing is advanced, and as the knocking is an abnormal combustion caused by an ignition spark, the abnormal combustion occurrence timing also advances when the ignition timing is advanced, and the knocking intensity IKNK increases.

Figure 5A:
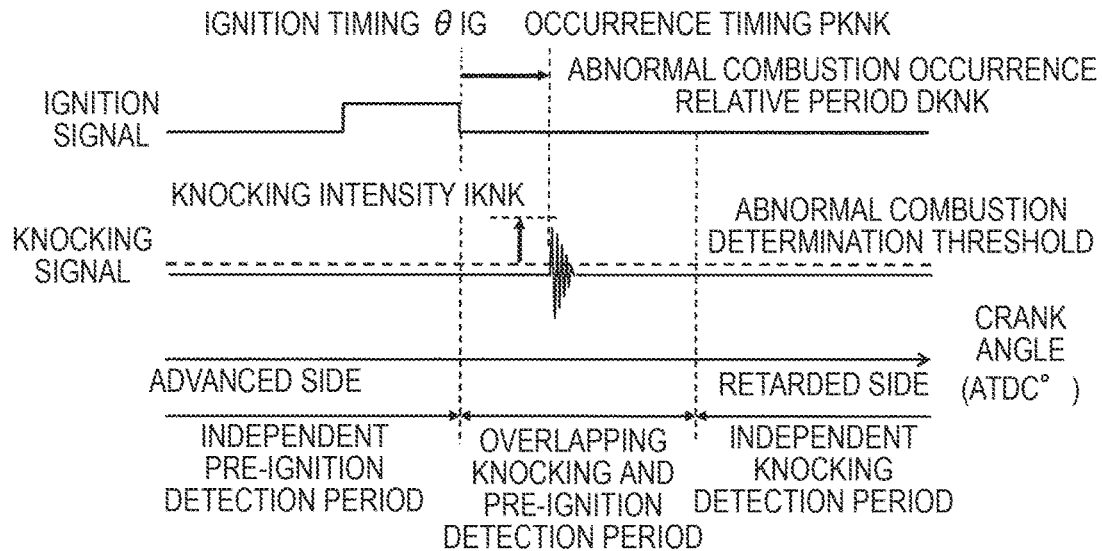
FIG. 5A is a timing chart for describing a change in a knocking sensor signal before an ignition timing advancement when a pre-ignition occurs according to the first embodiment of the invention.
Figure 5B:
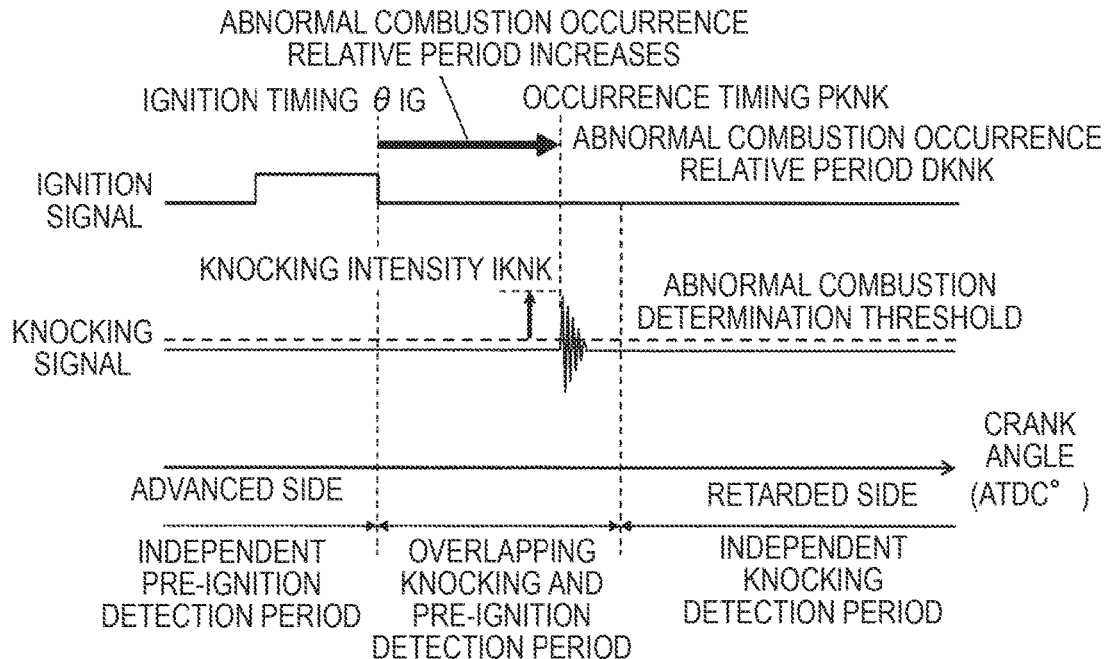
FIG. 5B is a timing chart for describing a change in a knocking sensor signal after an ignition timing advancement when a pre-ignition occurs according to the first embodiment of the invention.

FIGS. 5A and 5B show a change in a knocking signal when the ignition timing is advanced in a case in which an abnormal combustion is a pre-ignition. FIG. 5A shows a state before the ignition timing is advanced, FIG. 5B shows a state after the ignition timing is advanced, and as the source of the pre-ignition is not an ignition spark, the knocking signal does not change even when the ignition timing is advanced. That is, the knocking intensity IKNK does not change, and the abnormal combustion occurrence timing does not change either, because of which the difference between the ignition timing and abnormal combustion occurrence timing increases.

Therefore, when the knocking intensity IKNK increases when the ignition timing is advanced, the abnormal combustion can be identified as a knocking, and when the difference between the ignition timing and abnormal combustion occurrence timing increases, the abnormal combustion can be identified as a pre-ignition.

Next, a description will be given of a specific process when the ignition timing is advanced. Firstly, the knocking intensity IKNK before the ignition timing is advanced is stored as an initial knocking intensity IKNK0, and an abnormal combustion relative occurrence period DPKNK, which is a difference between an ignition timing θIG and the abnormal combustion occurrence timing PKNK, is stored as an initial abnormal combustion relative occurrence period DPKNK0.

$$IKNK0 = IKNK \quad (4)$$

$$DPKNK0 = DPKNK \quad (5)$$

because DPKNK=PKNK−θIG

Next, a deviation ΔIKNK between the knocking intensity IKNK when the ignition timing is advanced and the initial knocking intensity IKNK0, and a deviation ΔDPKNK between the abnormal combustion relative occurrence period DPKNK when the ignition timing is advanced and the initial abnormal combustion relative occurrence period DPKNK0, are calculated.

$$\Delta IKNK = IKNK - IKNK0 \quad (6)$$

$$\Delta DPKNK = DPKNK - DPKNK0 \quad (7)$$

When the deviation ΔIKNK when the ignition timing is advanced is equal to or greater than a preset threshold, it is determined that the abnormal combustion is a knocking, and the ignition timing continues to be maintained while an identification of a non-specific abnormal combustion is continuing. When changing from a pre-ignition to a knocking owing to the advancement of the ignition timing, pre-ignition will occur again when retarding the ignition timing because of the knocking identification, because of which an ignition timing retarding of the knocking control unit 4g to be described hereafter is not implemented.

Next, when the deviation ΔDPKNK when the ignition timing is advanced is equal to or greater than a preset predetermined value, it is determined that the abnormal combustion is a pre-ignition, ignition advancement by a non-specific abnormal combustion control is stopped, and the pre-ignition is restricted using, for example, a method according to the pre-ignition control unit 4f, to be described hereafter.

According to the above, knocking and pre-ignition can be identified without contributing to pre-ignition, and control in accordance with each abnormal combustion can be implemented.

Configuration of Pre-Ignition Control Unit 4f

Next, the pre-ignition control unit 4f will be described. The pre-ignition control unit 4f changes control parameters of the internal combustion engine 1 so that when a pre-ignition is identified, an occurrence of the pre-ignition is restricted. In this embodiment, the pre-ignition control unit 4f is configured so as to change an increase in the amount of fuel injected and an effective compression ratio as control parameters of the internal combustion engine 1. This is because, as lowering the cylinder temperature is effective in restricting pre-ignition, reducing the cylinder temperature at a time of a compression stroke by reducing the amount of intake air and lowering the effective compression ratio, and cooling the cylinder by increasing the amount of fuel and retarding the fuel injection timing, are effective as methods of lowering the cylinder temperature. The pre-ignition control unit 4f carries out a calculation of a target injection amount and a target effective compression ratio for avoiding pre-ignition, and the control device 4 carries out drive control of the injector 13 based on the target injection amount, and carries out drive control of the electric actuator of the variable intake valve timing mechanism in the intake valve 16 based on the target effective compression ratio.

Configuration of Knocking Control Unit 4g

Next, the knocking control unit 4g will be described. The knocking control unit 4g changes a control parameter of the internal combustion engine 1 in accordance with the knocking intensity IKNK so that an occurrence of a knocking is restricted. In this embodiment, the knocking control unit 4g is configured so as to change an ignition timing as a control parameter of the internal combustion engine 1. When the knocking intensity IKNK is positive, as shown in the following Expression 8, and the knocking control unit 4g determines that a knocking is occurring, the knocking control unit 4g calculates a value that is a value of the knocking intensity IKNK multiplied by a preset retarding amount calculation coefficient Kg and −1 lower-limited by a preset maximum retarding amount $\Delta\theta Rmin$ as a retarding update amount $\Delta\theta R$. The retarding update amount $\Delta\theta R$ is of a negative value. Meanwhile, when the knocking intensity IKNK is negative (equal to or less than 0 in this example), as shown in the following Expression 9, and the knocking control unit 4g determines that no knocking is occurring, the knocking control unit 4g sets 0 as the retarding update amount $\Delta\theta R$.

Herein, max [A, B] is a function that outputs maximum values of A and B.

$$IKNK>0 \quad (8)$$

$$\Delta\theta R(n)=\max\{-Kg \times IKNK(n), \Delta\theta Rmin\} IKNK \le 0 \quad (9)$$

$$\Delta\theta R(n)=0$$

Further, the knocking control unit 4g integrates the retarding update amount $\Delta\theta R$ at every interrupt processing, thereby calculating a retarding correction amount $\theta R$, as shown in the following Expression 10.

$$\theta R(n)=\min\{\theta R(n-1)+\Delta\theta R(n)+Ka, \theta Rmax\} \quad (10)$$

Herein, when Ka is a preset advanced side return amount, the knocking intensity IKNK is negative, and it is determined that no knocking is occurring ($\Delta\theta R(n)$–0), the retarding correction amount $\theta R$ is gradually caused to return to the advanced side. $\theta Rmax$, being a preset advanced side maximum value, is an upper limit value of the retarding correction amount $\theta R$. min{A, B} is a function that outputs minimum values of A and B.

The knocking control unit 4g sets a value that is the retarding correction amount $\theta R$ added to a basic ignition timing $\theta B$ as a final ignition timing $\theta IG$, as shown in the following Expression 11.

$$\theta IG(n)=\theta B(n)+\theta R(n) \quad (11)$$

The basic ignition timing $\theta B$ is a basic ignition timing calculated based on driving conditions of the internal combustion engine 1, such as a rotation speed, filling efficiency, and recirculated exhaust gas amount of the internal combustion engine 1, and is normally taken to be an ignition timing at which torque reaches a maximum. The control device 4 carries out a control energizing the ignition coil 15 based on the final ignition timing $\theta IG$ and crank angle.

The control device 4 according to the first embodiment is configured as heretofore described, and next, an outline of a processing procedure of the control device 4 (a method of controlling the internal combustion engine 1) will be described, based on a flowchart shown in FIG. 6.

Figure 6:
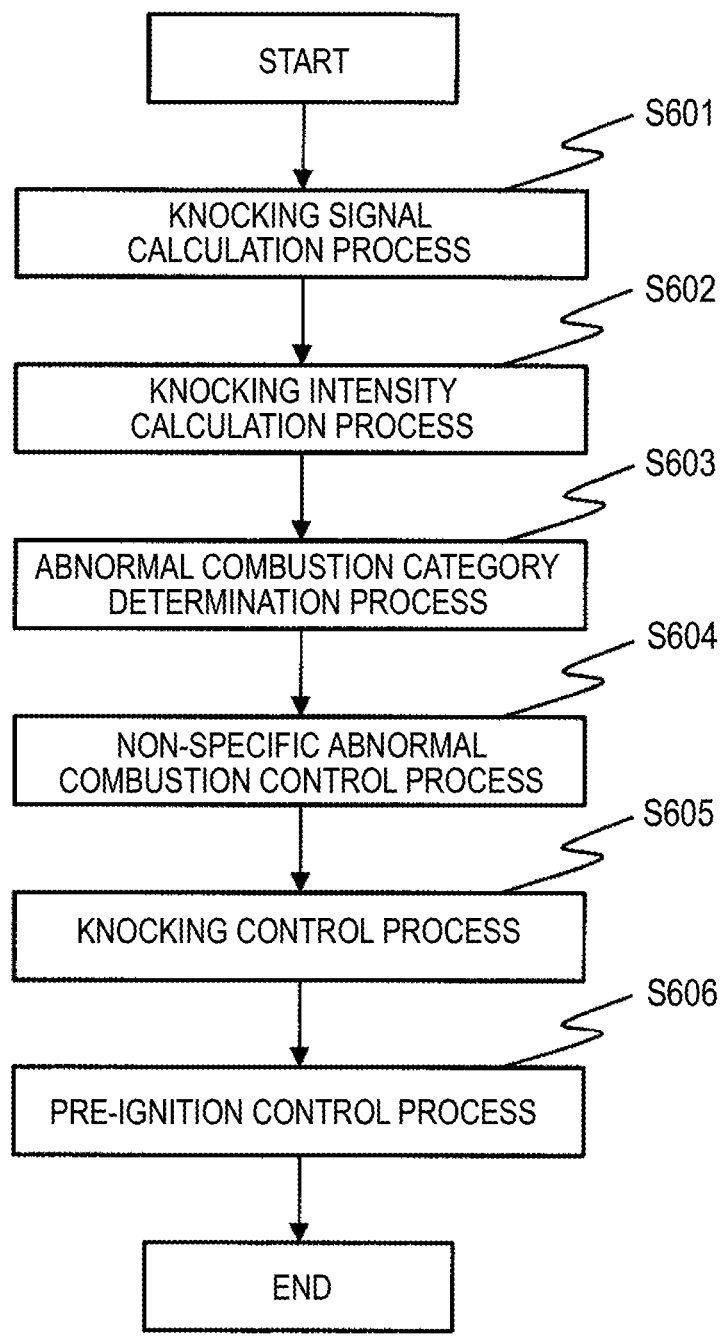
FIG. 6 is a flowchart showing a process of the internal combustion engine control device according to the first embodiment of the invention.

The process of the flowchart in FIG. 6 is repeatedly executed in every predetermined operating cycle by the processing unit 30 executing the software (program) stored in the storage device 31.

In step S601 of FIG. 6, the knocking signal calculation unit 4a, as heretofore described, executes a knocking signal calculation process (knocking signal calculation step) of calculating the knocking signal KNK, which represents a characteristic component of a knocking, and the abnormal combustion occurrence timing PKNK, based on an output signal from a combustion state detection device (the knocking sensor 20 in this embodiment) that outputs a signal in accordance with the combustion state of the internal combustion engine 1.

Next, in step S602, the knocking intensity calculation unit 4c, as heretofore described, executes a knocking intensity calculation process (knocking intensity calculation step) of calculating the knocking intensity IKNK based on the knocking signal KNK and knocking determination threshold TH.

When the knocking intensity IKNK has been calculated (IKNK>0), the abnormal combustion category determination unit 4d, as heretofore described, executes a process is step S603 of determining an abnormal combustion category to be a knocking, a pre-ignition, or a non-specific abnormal combustion in accordance with the abnormal combustion occurrence timing PKNK (an abnormal combustion category specification process step).

When an abnormal combustion is determined to be a non-specific abnormal combustion, the non-specific abnormal combustion control unit 4e, as heretofore described, advances the ignition timing, and determines whether the abnormal combustion is a knocking or a pre-ignition based on the deviation $\Delta IKNK$ of the knocking intensity IKNK and the deviation $\Delta DPKNK$ of the abnormal combustion relative occurrence period DPKNK in step S604. When determining that the abnormal combustion is a knocking, the non-specific abnormal combustion control unit 4e maintains the ignition timing, and when determining that the abnormal combustion is a pre-ignition, the non-specific abnormal combustion control unit 4e executes a non-specific abnormal combustion control process (non-specific abnormal combustion control step) of stopping the ignition timing advancement.

In step S605, when the abnormal combustion is determined to be a knocking, the knocking control unit 4g, as heretofore described, executes a knocking control process (knocking control step) of changing a control parameter (ignition timing in this example) of the internal combustion engine 1 in accordance with the knocking intensity IKNK so that a knocking occurrence is restricted.

In step S606, when the abnormal combustion is determined to be a pre-ignition, the pre-ignition control unit 4*f*, as heretofore described, executes a pre-ignition control process (pre-ignition control step) of changing control parameters (fuel injection and the variable intake valve timing mechanism of the intake valve 16 in this example) of the internal combustion engine 1 so that a pre-ignition occurrence is restricted.

Figure 7:
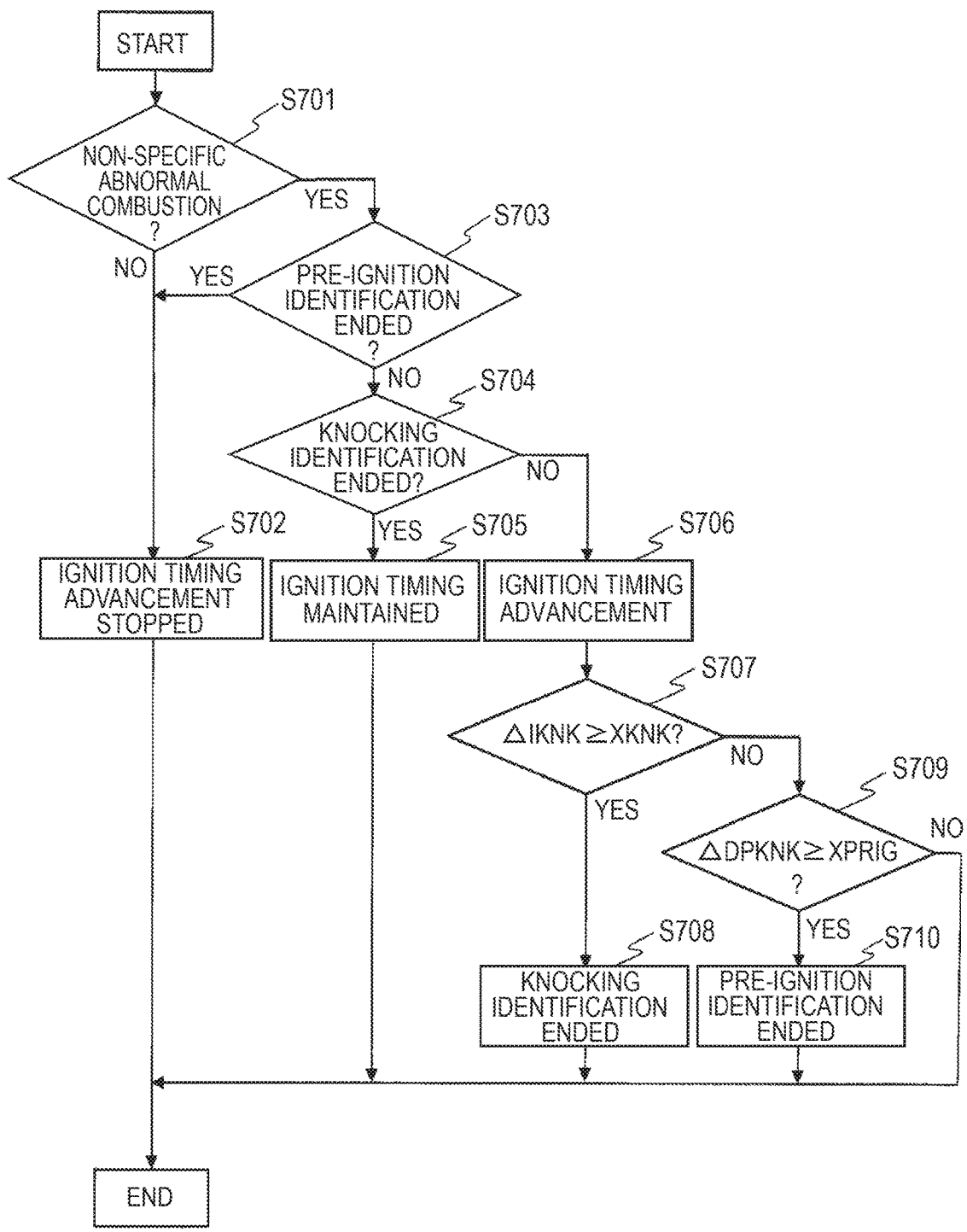
FIG. 7 is a flowchart illustrating a process of a non-specific abnormal combustion control unit according to the first embodiment of the invention.

Continuing, a more detailed process of the non-specific abnormal combustion control process in step S604 is shown in a flowchart of FIG. 7.

It is determined in step S701 of FIG. 7 whether or not an abnormal combustion is a non-specific abnormal combustion, and when the abnormal combustion is a non-specific abnormal combustion, the process advances to step S703. When the abnormal combustion is not a non-specific abnormal combustion, the process advances to step S702, and when an ignition timing advancement of step S706, to be described hereafter, is being carried out, the ignition timing advancement is stopped, and the non-specific abnormal combustion control process is ended.

In step S703, it is determined from the ignition timing advancement of step S706, to be described hereafter, whether or not a pre-ignition identification is ended. When the pre-ignition identification is ended, the process advances to step S702 in order to execute a pre-ignition control process of restricting pre-ignition using a method other than ignition timing, the ignition timing advancement is stopped, and the non-specific abnormal combustion control process is ended. When the pre-ignition identification is not ended, the process advances to step S704.

In step S704, it is determined from the ignition timing advancement of step S706, to be described hereafter, whether or not a knocking identification is ended. When the knocking identification is ended, the process advances to step S705, the ignition timing advancement is maintained, and the non-specific abnormal combustion control process is ended. When the knocking identification is not ended, the process advances to step S706.

The ignition timing is advanced in order to identify the abnormal combustion category in step S706, and the process advances to step S707.

In step S707, it is determined from the ignition timing advancement whether or not the deviation ΔIKNK of the knocking intensity IKNK is equal to or greater than a predetermined value XKNK. When the deviation ΔIKNK of the knocking intensity IKNK is equal to or greater than the predetermined value XKNK, it is determined that the abnormal combustion is a knocking, the process advances to step S708, the knocking identification is ended, and the non-specific abnormal combustion control process is ended. When the deviation ΔIKNK of the knocking intensity IKNK is not equal to or greater than the predetermined value XKNK, the process advances to step S709.

In step S709, it is determined from the ignition timing advancement whether or not the abnormal combustion relative occurrence period deviation ΔDPKNK is equal to or greater than a predetermined value XPRIG. When the abnormal combustion relative occurrence period deviation ΔDPKNK is equal to or greater than the predetermined value XPRIG, it is determined that the abnormal combustion is a pre-ignition, the process advances to step S710, the pre-ignition identification is ended, and the non-specific abnormal combustion control process is ended. When the abnormal combustion relative occurrence period deviation ΔDPKNK is not equal to or greater than the predetermined value XPRIG, nothing is done because the abnormal combustion category cannot yet be identified, and the non-specific abnormal combustion control process is ended.

According to the internal combustion engine abnormal combustion detection device according to the first embodiment, as heretofore described in detail, when detecting an abnormal combustion that cannot be identified as a knocking or pre-ignition, advancement is carried out without carrying out a retarding of ignition timing that contributes to pre-ignition. At this time, the abnormal combustion can be determined to be a knocking when the magnitude of abnormal combustion vibration increases, and the abnormal combustion can be determined to be a pre-ignition when the ignition timing and abnormal combustion occurrence timing periods increase. Therefore, knocking and pre-ignition can be identified without contributing to pre-ignition.

The embodiment can be modified or abbreviated as appropriate, without departing from the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine abnormal combustion detection device, comprising:
   a driving state detection device that detects a driving state of an internal combustion engine; and
   a control device that controls the internal combustion engine based on an output signal from the driving state detection device, wherein
   the control device includes
   an ignition timing controller that controls an ignition timing in accordance with the driving state,
   a crank angle detector that detects a crank angle of the internal combustion engine,
   an abnormal combustion vibration calculator that obtains a magnitude of an abnormal combustion vibration based on an output signal from a combustion state detection device provided in the internal combustion engine,
   an abnormal combustion vibration occurrence timing calculator that obtains an abnormal combustion vibration occurrence timing based on an output signal from the combustion state detection device provided in the internal combustion engine,
   an abnormal combustion relative occurrence period calculator that calculates relative periods of the ignition timing and an abnormal combustion occurrence period,
   an abnormal combustion detector that detects that an abnormal combustion has occurred when the magnitude of the abnormal combustion vibration exceeds a preset abnormal combustion determination threshold,
   a knocking intensity calculator that calculates an amount by which the abnormal combustion determination threshold is exceeded as knocking intensity,
   an abnormal combustion category controller that identifies one of a knocking, pre-ignition, or non-specific abnormal combustion based on the abnormal combustion vibration occurrence timing, and
   a non-specific abnormal combustion controller that, when a non-specific abnormal combustion is identified by the abnormal combustion category controller, advances an ignition timing set in accordance with the driving state, and when the ignition timing is advanced, identifies a knocking when knocking intensity increases, and identifies a pre-ignition when an abnormal combustion relative occurrence period increases.

2. The internal combustion engine abnormal combustion detection device according to claim 1, wherein the abnormal combustion category controller does not execute a control of the non-specific abnormal combustion when the knocking intensity is equal to or greater than a preset threshold.

3. The internal combustion engine abnormal combustion detection device according to claim 1, wherein the abnormal combustion category controller does not provide a pre-ignition detection period outside a low rotation/high load driving region, and does not execute a control of the non-specific abnormal combustion.

4. The internal combustion engine abnormal combustion detection device according to claim 1, wherein the non-specific abnormal combustion controller maintains an advanced state of ignition timing when a knocking is identified.

5. The internal combustion engine abnormal combustion detection device according to claim 1, wherein the non-specific abnormal combustion controller stops an advancement of ignition timing when a pre-ignition is identified.

* * * * *